United States Patent
Steadman Booker et al.

(10) Patent No.: US 10,444,381 B2
(45) Date of Patent: Oct. 15, 2019

(54) RADIATION DETECTOR AND IMAGING APPARATUS

(71) Applicant: KONINKLIJKE PHILIPS N.V., Eindhoven (NL)

(72) Inventors: Roger Steadman Booker, Aachen (DE); Carolina Ribbing, Aachen (DE); Walter Ruetten, Linnich (DE); Gereon Vogtmeier, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/778,847

(22) PCT Filed: Dec. 2, 2016

(86) PCT No.: PCT/EP2016/079620
§ 371 (c)(1),
(2) Date: May 24, 2018

(87) PCT Pub. No.: WO2017/093500
PCT Pub. Date: Jun. 8, 2017

(65) Prior Publication Data
US 2018/0356541 A1    Dec. 13, 2018

(30) Foreign Application Priority Data
Dec. 3, 2015  (EP) .................................... 15197765

(51) Int. Cl.
*G01J 1/00*    (2006.01)
*G01T 1/24*   (2006.01)
(Continued)

(52) U.S. Cl.
CPC .............. *G01T 1/243* (2013.01); *G01T 1/161* (2013.01); *G01T 1/17* (2013.01); *G01T 1/2018* (2013.01);
(Continued)

(58) Field of Classification Search
CPC ..... G01T 1/1644; G01T 1/2018; G01T 1/244; G01T 1/249; G01T 1/243; G01T 1/161; G01T 1/17; G01T 1/241; G01T 1/247
See application file for complete search history.

(56) References Cited

U.S. PATENT DOCUMENTS

6,472,668 B1 * 10/2002 Griesmer .............. G01T 1/1644
250/332
2001/0035497 A1   11/2001 Montemont
(Continued)

*Primary Examiner* — Kiho Kim
(74) *Attorney, Agent, or Firm* — Larry Liberchuk (57) ABSTRACT

The present invention relates to a radiation detector, in particular a direct conversion radiation detector. To provide for simple distribution of provided high voltage the radiation detector comprises a plurality of detector modules (10, 20) arranged adjacent to each other. Each detector module comprises a sensor layer (14, 24) for converting incident radiation (100) into electrical charges, a first electrode (15, 25) deposited on a first surface of the sensor layer facing the incident radiation (100), a second electrode (16, 26) deposited on a second surface of the sensor layer opposite the first surface, a readout electronics (12, 22) in electrical contact with the second electrode, and a carrier (13, 23) for carrying the sensor layer and the readout electronics. The radiation detector further comprises an electrically conductive conduction layer (30, 32, 50) and an anti-scatter arrangement (40), which are arranged on top of each other and cover the plurality of detector modules on the side facing the incident radiation (100).

20 Claims, 6 Drawing Sheets

(51) Int. Cl.
   *G01T 1/161*  (2006.01)
   *G01T 1/17*   (2006.01)
   *G01T 1/20*   (2006.01)

(52) U.S. Cl.
   CPC .............. *G01T 1/241* (2013.01); *G01T 1/244* (2013.01); *G01T 1/247* (2013.01); *G01T 1/249* (2013.01)

(56) References Cited

U.S. PATENT DOCUMENTS

| | | |
|---|---|---|
| 2006/0011852 A1 | 1/2006 | El-Hanany |
| 2008/0175347 A1 | 7/2008 | Tkaczyk |
| 2009/0045347 A1 | 2/2009 | Freund |
| 2010/0032579 A1 | 2/2010 | Chen |
| 2010/0061509 A1* | 3/2010 | D'Ambrosio ............ A61B 6/10 378/62 |
| 2011/0309259 A1 | 12/2011 | Kim |
| 2014/0348290 A1 | 11/2014 | Harrison |
| 2016/0131766 A1* | 5/2016 | Ergler ..................... G01T 1/243 250/336.1 |

* cited by examiner

RADIATION DETECTOR AND IMAGING APPARATUS

CROSS REFERENCE TO RELATED APPLICATIONS

This application is the U.S. National Phase application under 35 U.S.C. § 371 of International Application No. PCT/EP2016/079620, filed Dec. 2, 2016, published as WO 2017/093500 on Jun. 8, 2017, which claims the benefit of European Patent Application Number 15197765.9 filed Dec. 3, 2015. These applications are hereby incorporated by reference herein.

FIELD OF THE INVENTION

The present invention relates to a radiation detector and an imaging apparatus using such a radiation detector.

BACKGROUND OF THE INVENTION

Energy-Resolving Photon Counting detectors for Spectral CT make use of direct converting sensor materials, e.g. CdTe or CZT. These sensor materials are semiconductor compounds which require a high voltage bias (e.g. 300 V/mm) to ensure a homogeneous electric field within the bulk. As in conventional CT, Spectral CT detectors will require providing large coverage. To this end, Spectral CT detectors must also be tile-able on all sides, ultimately allowing extending the detector area to any desirable size.

Making a Spectral CT detector unit four side tile-able does not resolve alone all issues impacting the capability to extend the detector area. Contrary to the case of conventional detectors, the top side of the detector also requires biasing, i.e. a bias voltage must be applied to every tile or detector unit. For a limited coverage detector the high voltage may be brought for example onto the cathode by a small cable through a decoupling capacitor. For large detectors however, distributing the high voltage cannot be done with cable solutions since it typically requires soldering (i.e. impacts serviceability) and will interfere with the impinging X-ray spectrum.

US2001/035497 A1 discloses a radiation detector with a semiconducting detection component with electrodes on each side that is connected to a readout electronic circuit placed on a platform. US2008/175347 A1 discloses a direct conversion radiation detector with an anti-scatter assembly.

SUMMARY OF THE INVENTION

It is an object of the present invention to provide a radiation detector and an imaging apparatus using such a radiation detector having a simple construction for easily distributing the required high voltage to the plurality of detector modules.

In a first aspect of the present invention a radiation detector is presented comprising:
  a plurality of detector modules arranged adjacent to each other, each detector module comprising
    a sensor layer for converting incident radiation into electrical charges,
    a first electrode deposited on a first surface of the sensor layer facing the incident radiation,
    a second electrode deposited on a second surface of the sensor layer opposite the first surface,
    a readout electronics in electrical contact with the second electrode, and
    a carrier for carrying the sensor layer and the readout electronics,
  an electrically conductive conduction layer, and
  an anti-scatter arrangement,
wherein said conduction layer and said anti-scatter arrangement are arranged on top of each other and cover the plurality of detector modules on the side facing the incident radiation.

In a further aspect of the present invention an imaging apparatus is presented comprising a radiation detector as disclosed herein for detecting radiation from an imaging object in response to emission of radiation from a radiation source within the imaging object or external to the imaging object.

The conduction layer is arranged between the anti-scatter arrangement and the plurality of detector modules and comprises a conductive, mechanically compressible damping layer.

Preferred embodiments of the invention are defined in the dependent claims. It shall be understood that the claimed imaging apparatus have similar and/or identical preferred embodiments as the claimed radiation detector, in particular as defined in the dependent claims and as disclosed herein.

The present invention is based on the idea to use a common conductive element (i.e. a common conduction layer) to either make direct or indirect (via the anti-scatter arrangement) contact to the first electrode of subgroups or, preferably, each detector module (i.e. each tile). The combination of anti-scatter arrangement and common conductive element thus preferably covers the first electrodes of groups of or all detector modules. The common conductive element acts as a voltage distributor. This prevents the need of any additional complicated routing from the detector side, i.e. no separate coupling elements or cabling is required between the first electrodes.

The damping layer ensures an even contact pressure throughout the radiation detector and makes sure that a certain degree of unevenness does not impair a proper high voltage contact to every single detector module Preferably, the conduction layer covers the plurality of detector modules on the side facing the incident radiation and the anti-scatter arrangement is arranged on the side of the conduction layer facing the incident radiation. In another embodiment, the anti-scatter arrangement covers the plurality of detector modules on the side facing the incident radiation and the conduction layer is arranged on the side of the conduction layer facing the incident radiation.

The first electrode may preferably act as cathode, while the second electrode may preferably act as anode. In other embodiments, however, first electrode may act as anode, while the second electrode acts as cathode, i.e. the common electrode is the anode and the cathode is structured, which is particularly the case if hole-collection detectors (e.g. p-type silicon) are used.

The conduction layer itself can serve as common conductive element for distributing the high voltage to the detector modules, for which purpose the conduction layer comprises a terminal for receiving a voltage. In other embodiments the high voltage is provided from the (external) voltage supply to a different layer of the radiation detector and conducted through the conduction layer within the radiation detector.

There are different embodiments for implementing the damping layer. In one embodiment the damping layer comprises a conductive sheet or foam. Such a sheet or foam provides the desired feature ensuring an even contact pressure.

The damping layer may be made of Ni, Au, Ag and Cu, or metal mesh tapes, or of conductive polymers or foams or fabrics, or elastomeric inter-connectors (e.g. carbon elastomers, metal elastomers, PET, e.g. with embedded conductors such as carbon or metals). The conduction is preferably only in the z-axis (thickness), i.e. the metals are typically conductive "rods". Typical uses are LCD contacts, MEMS, etc.

In another embodiment the damping layer comprises a plurality of spring elements, which may be mechanically fixed to the anti-scatter arrangement. This provides another mechanically simple solution for providing an even contact pressure.

In another embodiment the anti-scatter arrangement is made of a conductive material. Hence, it can preferably serve as common conductive element for distributing the high voltage to the detector modules, for which purpose the anti-scatter arrangement preferably comprises a terminal for receiving a voltage.

The radiation detector may further comprise a conductive distribution layer arranged between the damping layer and the anti-scatter arrangement. Also this distribution layer may preferably serve as common conductive element for distributing the high voltage to the detector modules, for which purpose the distribution layer comprises a terminal for receiving a voltage. The conductive distribution layer may also serve as conduction layer and the damping layer may also be omitted.

Further, the radiation detector may further comprise an insulation layer arranged between the distribution layer and the anti-scatter arrangement. This insulation layer ensures that the anti-scatter arrangement is not in electrical contact with the layer serving as common conductive element.

The detector modules are preferably configured to be separately removable. Hence, in case of damage of a module it can be easily replaced, and the modules can also be manufactured easier than a single large detector unit.

In a realistic implementation the conduction layer has a thickness in the range of 50 μm and 10 mm, in particular in the range of 100 μm and 2 mm.

The radiation detector is preferably used for detecting x-ray or gamma radiation. The radiation may be emitted by a radiation source arranged outside the imaging object (such as an x-ray source or a gamma ray source) or arranged inside the imaging object (such as a radioisotope or probe inserted into the imaging object). The imaging apparatus may thus e.g. be an x-ray apparatus, a CT apparatus, a PET apparatus, a SPECT apparatus, etc. Besides the radiation detector the disclosed imaging apparatus may thus further comprise a radiation source for emitting radiation through the imaging object.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
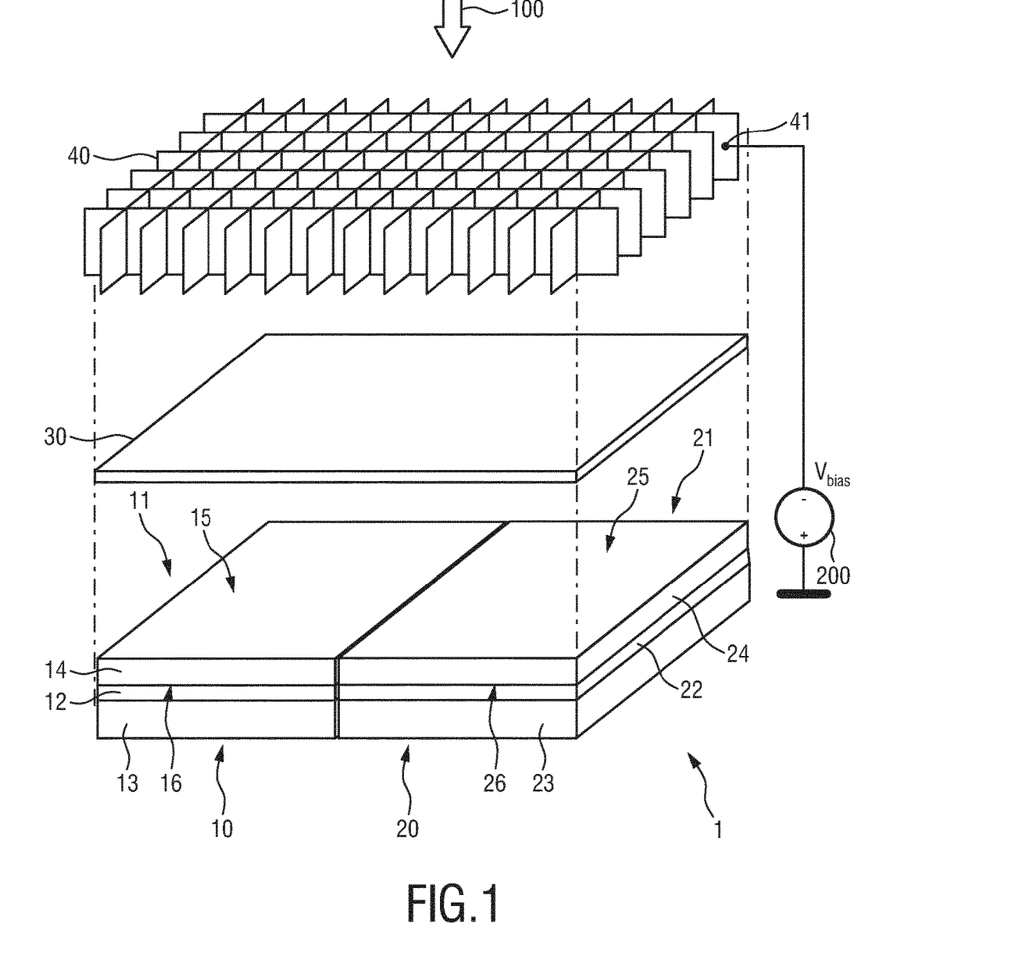
FIG. 1 shows an exploded perspective view of a first embodiment of a radiation detector according to the present invention.

FIG. 1 shows an exploded perspective view of a first embodiment of a radiation detector 1 according to the present invention. The large radiation detector 1 comprises a plurality of tiles (i.e. detector modules) 10, 20, wherein only two adjacent tiles are shown. Each tile 10, 20 comprises one or more direct converter sensors 11, 21, one or more ASICs 12, 22 (i.e. readout electronics, e.g. energy-resolving photon counting electronics) and a substrate 13, 23 (i.e. carrier) for mounting, i.e. carrying the sensors 11, 21 and the ASICs 12, 22. Each of the direct converter sensors 11, 21 comprises a sensor layer 14, 24 for converting incident radiation into electrical charges, a first electrode 15, 25 deposited on a first surface of the sensor layer 14, 24 facing the incident radiation 100 (e.g. x-ray radiation or gamma radiation), and a second electrode 16, 26 deposited on a second surface of the sensor layer 14, 24 opposite the first surface. More details of the second level interconnection between the ASICs 12, 22, which are in electrical contact with the second electrode 16, 26, and the direct converter sensors 11, 21 are not depicted. The second electrode may hereby comprise one electrode or a plurality of electrodes arranged in an array.

In this embodiment, the first electrode 15, 25 acts as cathode and the second electrode 16, 26 acts as anode. There are other embodiments, in which the first electrode 15, 25 acts as anode and the second electrode 16, 26 acts as cathode. On top of each tile 10, 20 a common electrically conductive damping layer 30, serving in this embodiment as conduction layer and covering the plurality of tiles 10, 20 on the side facing the incident radiation 100 is arranged. The damping layer 30 is, in this embodiment, configured as a conductive sheet or foam and makes electrical contact to the first electrodes 15, 25 acting as cathode. The conductive damping layer 30 is preferably mechanically compressible and shared among all or a subset of tiles 10, 20.

On top of the damping layer 30 an anti-scatter arrangement 40, in particular a one-dimensional or—as depicted—two-dimensional anti-scatter grid (ASG), is arranged facing the incident radiation 100. In this embodiment the anti-scatter arrangement 40 is made of electrically conductive material and thus establishes an electrical contact with the electrically conductive damping layer 30. The anti-scatter arrangement 40 is further electrically connected to a high voltage supply 200, for which it preferably comprises a terminal 41 for receiving the voltage from the supply 200.

This arrangement of the radiation detector 1 provides that the bias voltage provided by the supply 200 is effectively distributed to every single tile 10, 20.

Since anti-scatter grids are typically made of low resistivity metals, e.g. W (Tungsten), the series resistance from the high voltage 200 to the damping layer 30 may be kept very low over a very large area, even if a single point of contact is used. Conductive sheets for use as damping layer 30 can be found with reasonably low square resistance (<0.2

Ohm/square). Since the contact of the anti-scatter grid 40 is by definition on top of every single tile 10, 20, the series resistance per tile is also kept reasonably low. In other words, the low resistance anti-scatter grid 40 is used to distribute the high voltage while the somewhat more resistive conductive sheet 30 will only impact each tile 10, 20 locally. In this way a homogeneous high voltage distribution over a large area is ensured.

Although FIG. 1 only exemplarily shows two tiles 10, 20 sharing a single common damping layer 30, it is to be understood that it can be scaled to any area and number of tiles. In practice, damping layers 30 may be shared among a limited number of tiles to facilitate servicing, i.e. replacing a tile does not require removing the damping layer 30 covering the complete set of tiles 10, 20. The damping layer 30 can therefore have a plurality of form factors, ranging from one single conductive sheet per radiation detector to e.g. having one sheet per row or column of tiles.

Since direct conversion materials like CZT are brittle sensitive to excessive pressure, a compressible conductive sheet is preferable for use as damping layer 30 to avoid direct and punctual contact of the lamellae of the anti-scatter grid 40 to the first electrodes 15, 25 (cathode) of the sensor layers 14, 24 (although this is generally possible in other embodiments). Compressible conductive sheets will also compensate for small differences in height of the detector modules 10, 20. Such conductive sheets are available in different thicknesses (e.g. 1 mm) and can operate at temperatures from −40 to +70° C. Examples of such sheets are available at multiple suppliers (e.g. Laird Technologies with Ni/Cu meshes). If the absorption of the Ni/Cu mesh is considered too high, elastomeric inter-connect type of materials with conducting trenches or rods may be used at the same pitch as the anti-scatter grid 40. Although this may pose some difficulties in terms of alignment, conductive trenches in the range of 100 µm are available which will remove any probability of x-ray absorption on top of the effective sensor pixels. Another example of conductive sheets is a conductive polymer foam, as e.g. commonly used in the electronics industry, to protect sensitive integrated circuits from electric discharges during transport (e.g. supplied by Vermason).

Figure 2:
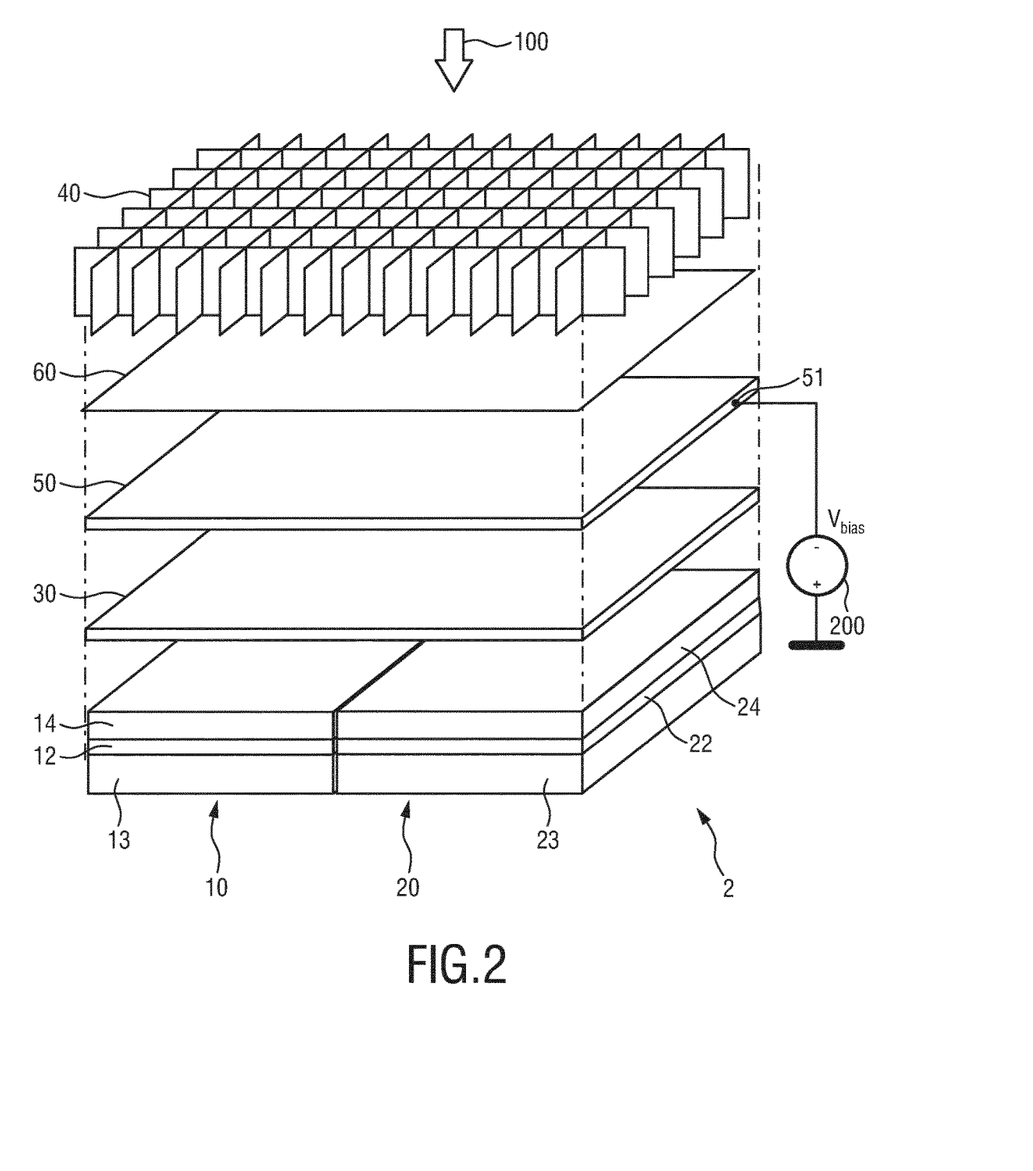
FIG. 2 shows an exploded perspective view of a second embodiment of a radiation detector according to the present invention.

FIG. 2 shows an exploded perspective view of a second embodiment of a radiation detector 2 according to the present invention. In this embodiment, a conductive distribution layer 50 is arranged between the damping layer 30 (serving as conduction layer) and the anti-scatter arrangement 40. For instance, a thin metal foil, e.g. of aluminum or a plated metal sheet for good electrical contact, may be placed on top of the damping layer 30 to provide a low resistive distribution layer 50 for the high voltage provided by the supply 200 via a terminal 51. This metal sheet can be made of a plurality of materials or thin-film plated metals (e.g. Al, Cu, Zn, Ag, Mg, Ti, alloys, ITO (TCO etc.), carbon (e.g. nanotubes, graphene), or a metal microstructure). The thin layer of a light metal will have only minimal influence on the detected radiation spectra.

Optionally, as shown in this embodiment, the distribution layer 50 is covered with an insulation layer 60 (i.e. arranged between the distribution layer 50 and the anti-scatter grid 40) so that the anti-scatter grid 40 is not connected to the high voltage, if this is desirable, or can even be grounded for electrical safety purposes.

The use of a large area thin metal foil as distribution layer 50 is also advantageous if the anti-scatter grid 40 itself is made in a tiled approach, i.e. consists of small blocks or sub-grids. With such small blocks, the distribution of high voltage through the anti-scatter grids is more difficult and requires additional means for interconnecting the blocks or sub-grids.

Further, in an embodiment the anti-scatter grid 40 may be arranged in direct contact with the detector units 10, 20, so that no intermediate layer (e.g. a damping layer) is required.

If the anti-scatter grid 40 is tiled, it may again be in direct contact with the detector units 10, 20 to ensure proper alignment of the anti-scatter grid 40 and the detector units 10, 20, In this case the damping layer 30 may be arranged on top of the anti-scatter grid 40, making the distribution of the high voltage.

Figure 3:
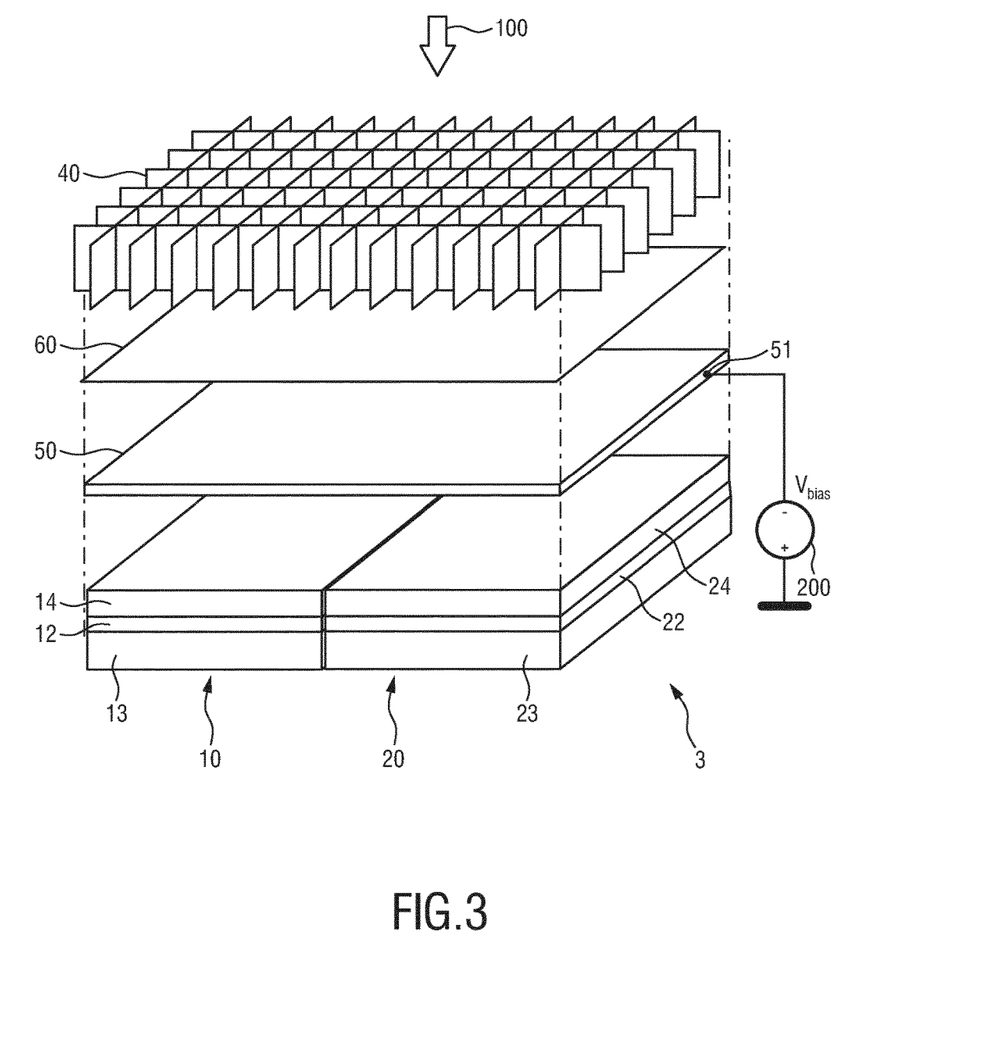
FIG. 3 shows an exploded perspective view of a third embodiment of a radiation detector according to the present invention.

In the second embodiment of the radiation detector 2 the damping layer 30 (e.g. the conductive foam as shown in FIG. 1) is not strictly necessary, as illustrated in FIG. 3 showing an exploded perspective view of a third embodiment of a radiation detector 3 according to the present invention. In this embodiment there is hence a direct contact between the distribution layer 50 and the first electrodes 15, 25 of the tiles 10, 20. The use of a damping layer 30, as provided in the second embodiment, is however beneficial to ensure an even contact pressure throughout the radiation detector and to make sure that a certain degree of unevenness does not impair a proper high voltage contact to every single tile.

Figure 4:
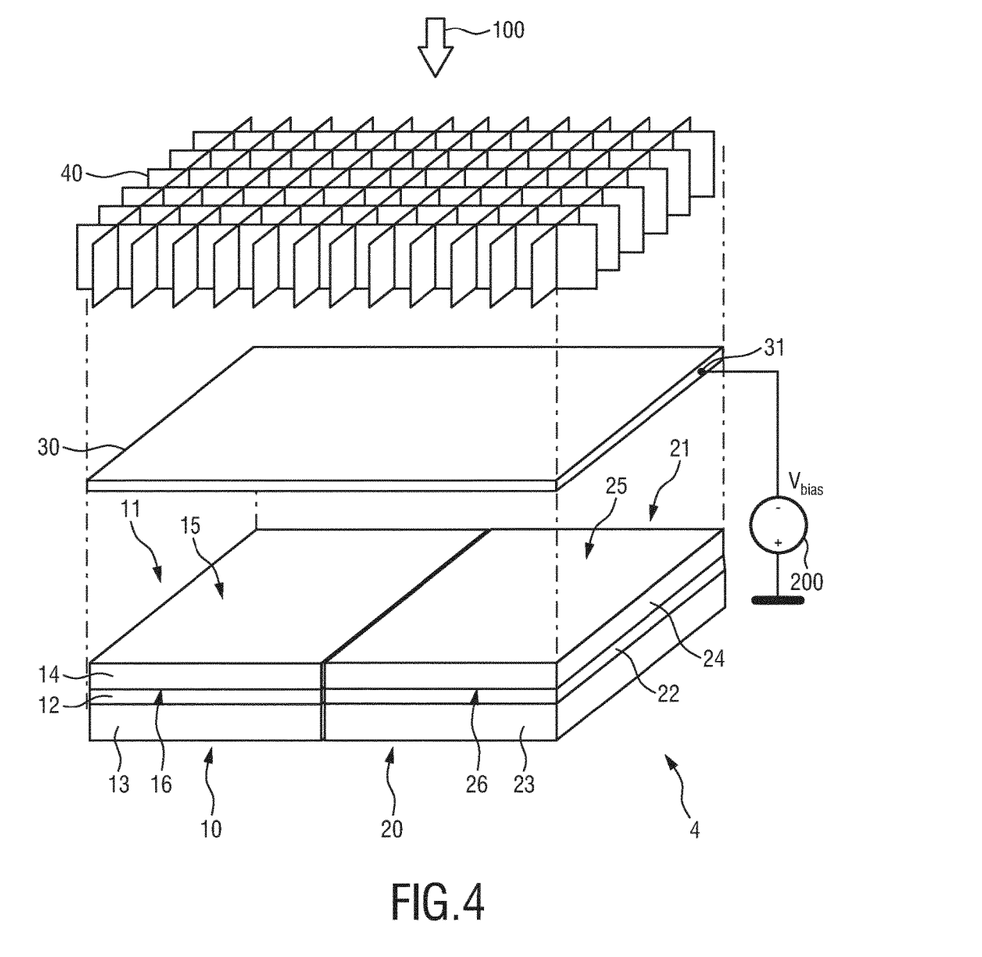
FIG. 4 shows an exploded perspective view of a fourth embodiment of a radiation detector according to the present invention.

FIG. 4 shows an exploded perspective view of a fourth embodiment of a radiation detector 4 according to the present invention. In this embodiment the conductive damping layer 30 (preferably in the form of conductive foam) itself is used as conduction layer and for distributing the high voltage provided by the external voltage supply via a terminal 31. The anti-scatter grid 40 does hence not need to be electrically connected to the high voltage supply and does also not need to be electrically conductive.

Since CZT sensors typically exhibit low dark currents and the maximum photocurrent per tile is also rather low (e.g. 20 µA/tile), a sheet (as damping layer) may be sufficiently low resistive to fulfill the requirements (e.g. the sheet forming a compressible metal mesh). Additional measures, e.g. multiple contacts 31 along the sides of the damping layer 30 may be taken to ensure that the high voltage remains reasonably homogeneous across the whole group of tiles to avoid a position dependent performance of the radiation detector since e.g. CZT transient responses may be slower in those locations where the high voltage is lowest.

The quality of the high voltage contact between the conduction layer and the first electrodes (cathodes) can easily be assessed by observing a degradation of the pulse height spectra. A compressed spectrum over time may be indicative of a high resistance contact to the cathode. The sensor bulk resistivity is however very high, so that the main potential concern is not the contact resistance to the cathodes itself, but rather the voltage distribution across the conduction layer, i.e. the damping layer 30 in the first, second and fourth embodiments and the distribution layer 50 in the third embodiment, respectively. To this end, the high voltage distribution using either the anti-scatter grid 40 or the distribution layer 50 may be the preferred implementations.

The anti-scatter arrangement 40 is preferably configured as a large area anti-scatter grid. Such a grid may e.g. be made of laser sintering and may be used as carrier for several detector tiles. The conductive foam as damping layer is one option for electrical interface, i.e. as conduction layer.

Figure 5:
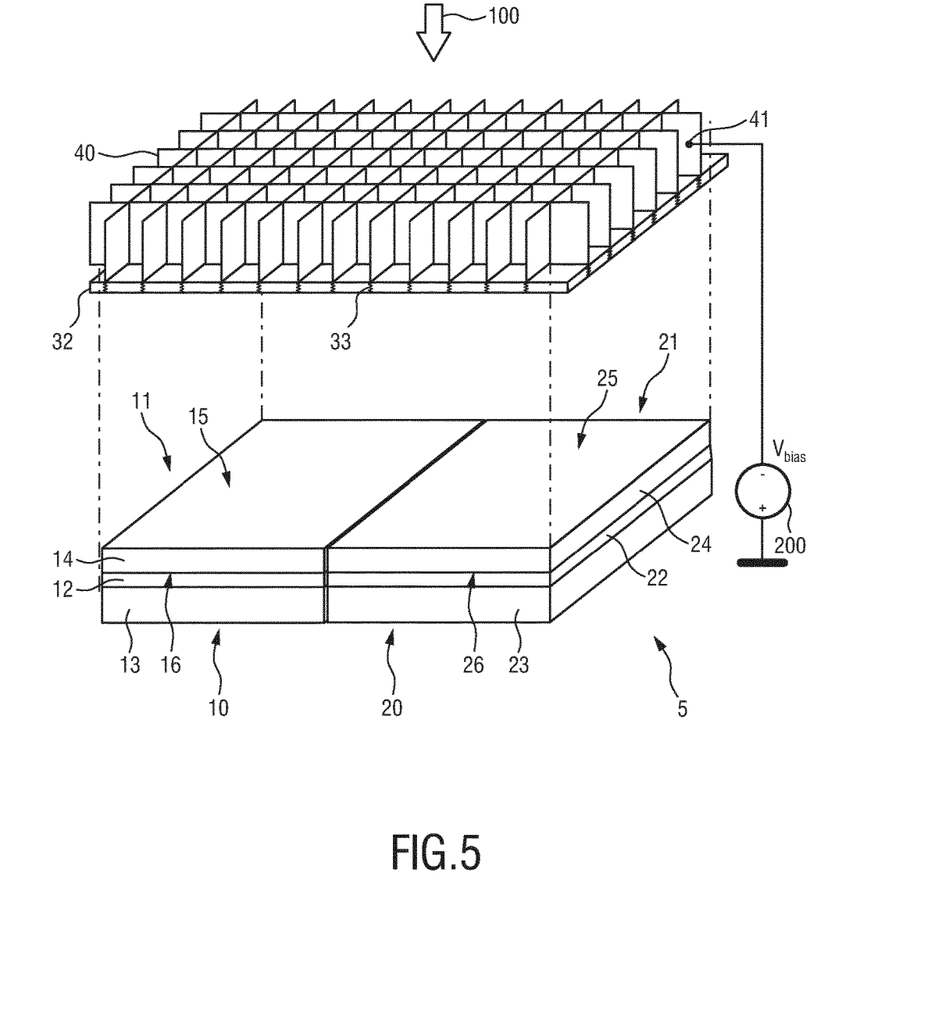
FIG. 5 shows an exploded perspective view of a fifth embodiment of a radiation detector according to the present invention.

FIG. 5 shows an exploded perspective view of a fifth embodiment of a radiation detector 5 according to the present invention. According to this embodiment electrical spring contacts 33 are provided as damping layer 32 (serving also as conduction layer). The spring contacts are preferably arranged (in particular mechanically fixed) at the lower surface of the anti-scatter grid 43 and contact the tiles 10, 11. Laser sintering technology may be used to enable customized production of electrical spring contacts at dedicated positions of the anti-scatter grid which allows individual (multiple) electrical contacts to each tile.

Figure 6:
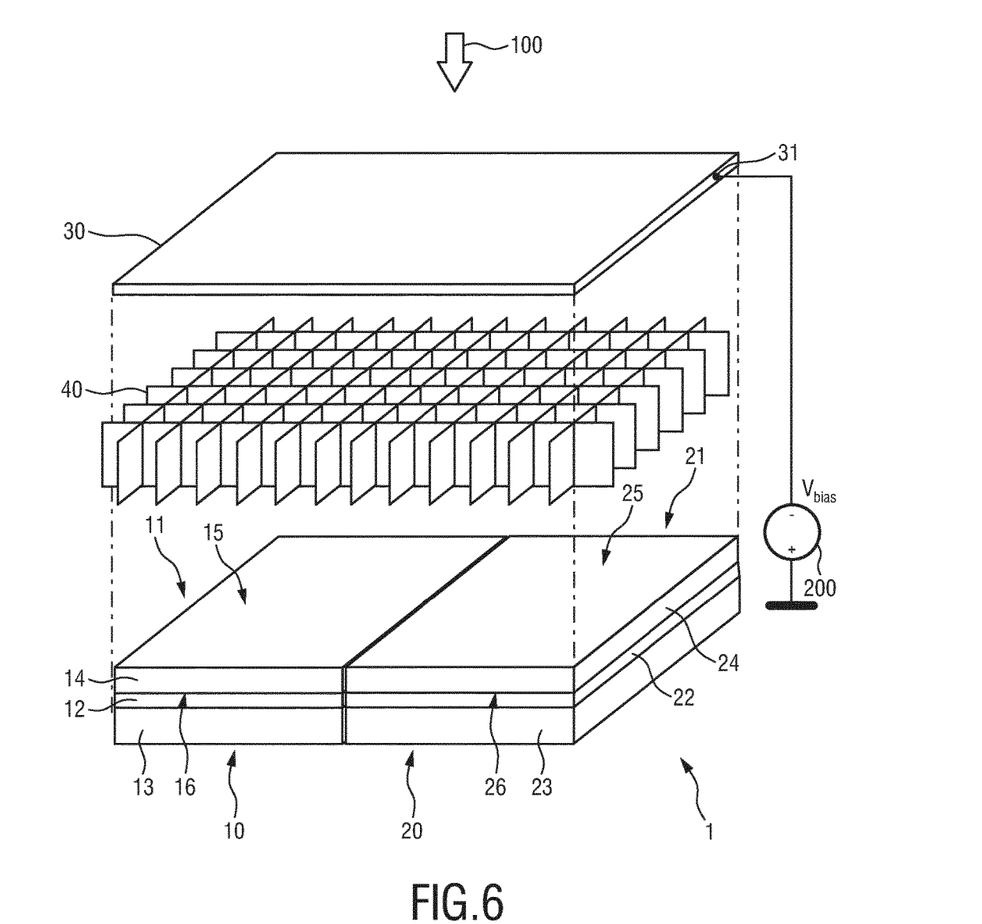
FIG. 6 shows an exploded perspective view of a sixth embodiment of a radiation detector according to the present invention.

FIG. 6 shows an exploded perspective view of a sixth embodiment of a radiation detector 6 according to the present invention. In this embodiment the anti-scatter arrangement 40 directly covers the plurality of detector modules 10, 20 and the conduction layer 30 is arranged on the side of the conduction layer facing the incident radiation 100. The voltage is provided to the conduction layer 30 and distributed from the conduction layer 30 via the (electrically conductive) anti-scatter arrangement 40 to the detector modules 10, 20. In this way proper alignment of the anti-scatter arrangement 40 and the detector modules 10, 20 can be ensured.

In still another embodiment the anti-scatter arrangement 40 may even be completely omitted so that the conduction layer 30 is in direct contact with the detector elements, receives the voltage from the voltage supply 200 and distributes the received voltage to the detector elements 10, 20. Such an embodiment may e.g. be used in medical applications like Spectral X-ray or photon-counting/spectral Mammography, where the actual detector usually comes without anti-scatter grid and the anti-scatter grid is optional and will be added by the physician as he sees fit. Also in such applications the detector may be split into smaller modules (tiles), and the voltage distribution may be achieved as disclosed herein.

The present invention is particularly suited for large area spectral CT detectors, but also applicable to non-destructive testing (NDT), baggage inspection or any other imaging devices and modalities where direct conversion radiation detectors are used over a large area.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A radiation detector comprising:
   a plurality of detector modules arranged adjacent to each other;
   an electrically conductive conduction layer; and
   an anti-scatter arrangement,
   wherein each detector module comprises:
      a sensor layer comprising a first surface facing incident radiation and a second surface opposite the first surface, wherein the sensor layer converts the incident radiation into electrical charges;
      a first electrode comprising a first surface and a second surface opposite the first surface, wherein the second surface of the first electrode is deposited on the first surface of the sensor layer;
      a second electrode comprising a first surface a second surface opposite the first surface, wherein the first surface of the second electrode deposited on the second surface of the sensor layer;
      a readout electronics comprising a first surface in electrical contact with the second electrode and a second surface opposite the first surface; and
      a carrier mounted to the second surface of the readout electronics;
   wherein the electrically conductive conduction layer comprises a mechanically compressible damping layer, a first surface facing the incident radiation and a second surface opposite the first surface; and
   wherein the anti-scatter arrangement is between the second surface of the electrically conductive conduction layer and the first surface of the sensor layer.

2. The radiation detector as claimed in claim 1, wherein the conduction layer comprises a terminal for receiving a voltage.

3. The radiation detector as claimed in claim 1, wherein the damping layer comprises a conductive sheet or foam.

4. The radiation detector as claimed in claim 1, wherein the damping layer comprises a plurality of spring elements.

5. The radiation detector as claimed in claim 4, wherein the spring elements are mechanically fixed to the anti-scatter arrangement.

6. The radiation detector as claimed in claim 1, wherein the anti-scatter arrangement is made of a conductive material.

7. The radiation detector as claimed in claim 6, wherein the anti-scatter arrangement comprises a terminal for receiving a voltage.

8. The radiation detector as claimed in claim 1, further comprising a conductive distribution layer arranged between the damping layer and the anti-scatter arrangement.

9. The radiation detector as claimed in claim 8, wherein the distribution layer comprises a terminal for receiving a voltage.

10. The radiation detector as claimed in claim 9, further comprising an insulation layer arranged between the distribution layer and the anti-scatter arrangement.

11. The radiation detector as claimed in claim 1, wherein the detector modules are configured to be separately removable.

12. The radiation detector as claimed in claim 1, wherein the conduction layer has a thickness in the range of 50 μm and 10 mm.

13. An imaging apparatus comprising a radiation detector as claimed in claim 1 for detecting radiation from an imaging object in response to emission of radiation from a radiation source within the imaging object or external to the imaging object.

14. The imaging apparatus as claimed in claim 13, further comprising a radiation source for emitting radiation through the imaging object.

15. The radiation detector as claimed in claim 1, wherein the electrically conductive conduction layer and the anti-scatter arrangement cover all of the detector modules.

16. The radiation detector as claimed in claim 1, wherein the electrically conductive conduction layer and the anti-scatter arrangement cover a subset of the detector modules.

17. A radiation detector comprising:
a plurality of detector modules arranged adjacent to each other;
an electrically conductive conduction layer comprising a mechanically compressible damping layer; and
a two-dimensional anti-scatter grid,
wherein each detector module comprises:
a sensor layer comprising a first surface facing incident radiation and a second surface opposite the first surface, wherein the sensor layer converts the incident radiation into electrical charges;
a first electrode comprising a first surface and a second surface opposite the first surface, wherein the second surface of the first electrode is deposited on the first surface of the sensor layer;
a second electrode comprising a first surface a second surface opposite the first surface, wherein the first surface of the second electrode deposited on the second surface of the sensor layer;
a conductive distribution layer arranged between the damping layer and the two-dimensional anti-scatter grid;
a readout electronics comprising a first surface in electrical contact with the second electrode and a second surface opposite the first surface; and
a carrier mounted to the second surface of the readout electronics,
wherein the two-dimensional anti-scatter grid comprises a first surface facing the incident radiation and a second surface opposite the first surface; and
wherein the electrically conductive conduction layer is between the second surface of the two-dimensional anti-scatter grid and the first surface of the sensor layer.

18. The radiation detector as claimed in claim 17, wherein the distribution layer comprises a terminal for receiving a voltage.

19. The radiation detector as claimed in claim 18, further comprising an insulation layer arranged between the distribution layer and the two-dimensional anti-scatter arrangement.

20. A radiation detector comprising:
a plurality of detector modules arranged adjacent to each other;
an electrically conductive conduction layer comprising a mechanically compressible damping layer; and
a two-dimensional anti-scatter grid,
wherein each detector module comprises:
a sensor layer comprising a first surface facing incident radiation and a second surface opposite the first surface, wherein the sensor layer converts the incident radiation into electrical charges;
a first electrode comprising a first surface and a second surface opposite the first surface, wherein the second surface of the first electrode is deposited on the first surface of the sensor layer;
a second electrode comprising a first surface a second surface opposite the first surface, wherein the first surface of the second electrode deposited on the second surface of the sensor layer;
a conductive distribution layer arranged between the damping layer and the two-dimensional anti-scatter arrangement;
a readout electronics comprising a first surface in electrical contact with the second electrode and a second surface opposite the first surface; and
a carrier mounted to the second surface of the readout electronics,
wherein the damping layer comprises a plurality of spring elements mechanically fixed to the two-dimensional anti-scatter grid;
wherein the two-dimensional anti-scatter grid comprises a first surface facing the incident radiation and a second surface opposite the first surface, and
wherein the electrically conductive conduction layer is between the second surface of the two-dimensional anti-scatter grid and the first surface of the sensor layer.

* * * * *